(12) United States Patent
Drennen et al.

(10) Patent No.: US 9,586,678 B2
(45) Date of Patent: *Mar. 7, 2017

(54) BI-STABLE VOICE COIL PARK BRAKE (71) Applicant: Goodrich Corporation, Charlotte, NC (US)

(72) Inventors: David Drennen, Bellbrook, OH (US); Kevin Rehfus, Troy, OH (US); Robert French, Beavercreek, OH (US); Harald Klode, Centerville, OH (US)

(73) Assignee: United Technologies Corporation, Hartford, CT (US)

( * ) Notice: Subject to any disclaimer, the term of this patent is extended or adjusted under 35 U.S.C. 154(b) by 37 days.

This patent is subject to a terminal disclaimer.

(21) Appl. No.: 14/597,732

(22) Filed: Jan. 15, 2015

(65) Prior Publication Data
US 2016/0207613 A1    Jul. 21, 2016

(51) Int. Cl.
*B60L 7/00* (2006.01)
*F16D 121/18* (2012.01)
(Continued)

(52) U.S. Cl.
CPC ............ *B64C 25/44* (2013.01); *B60T 13/741* (2013.01); *B60T 13/748* (2013.01); *F16D 49/02* (2013.01);
(Continued)

(58) Field of Classification Search
CPC ...... B60T 11/105; B60T 13/74; B60T 13/746; B60T 13/741; B64C 25/44; F16D 65/12;
(Continued)

(56) References Cited

U.S. PATENT DOCUMENTS 2,430,174 A * 11/1947 Hoover .................. F16D 27/08
                                                         192/18 B
2,949,172 A *  8/1960 Simons ................. F16D 63/006
                                                         188/171
(Continued)

FOREIGN PATENT DOCUMENTS

DE       19752543        6/1999
DE       10233673        3/2003
(Continued)

OTHER PUBLICATIONS

Extended European Search Report dated Jun. 13, 2016 in European Application No. 16151102.7.

*Primary Examiner* — Robert A Siconolfi
*Assistant Examiner* — San Aung
(74) *Attorney, Agent, or Firm* — Snell & Wilmer L.L.P.

(57) ABSTRACT

The present disclosure provides devices and methods related to park brake systems and methods. In various embodiments, a park brake system may comprise a motor shaft having a first diameter portion and a second diameter portion, the second diameter portion having a greater diameter than the first diameter portion. A park brake system may further comprise a spring disposed at least partially around a circumference of the motor shaft, a wire coil disposed at least partially around a circumference of a bobbin, a one-way clutch disposed at least partially within the bobbin and coaxial to the motor shaft, an annular magnet disposed coaxial to the motor shaft and distal to at least a portion of the bobbin, and a clutch release mechanism disposed coaxial to the motor shaft and around the first diameter portion. In response to a first voltage being applied to the wire coil, the one-way clutch may translate axially in a first direction relative to the motor shaft and engage with the second diameter portion; in response to a second voltage applied to the wire coil, the one-way clutch may translate axially in a (Continued)

second direction relative to the motor shaft and engage with the clutch release mechanism.

15 Claims, 6 Drawing Sheets

(51) Int. Cl.
*B64C 25/44* (2006.01)
*B60T 13/74* (2006.01)
*F16D 49/02* (2006.01)
*F16D 63/00* (2006.01)
*F16D 65/16* (2006.01)
*F16D 127/06* (2012.01)

(52) U.S. Cl.
CPC ........... *F16D 63/002* (2013.01); *F16D 65/16* (2013.01); *F16D 2127/06* (2013.01)

(58) Field of Classification Search
CPC ...... F16D 65/14; F16D 65/183; F16D 65/186; F16D 59/02; F16D 63/002; F16D 2121/18; F16D 2121/20; F16D 2121/22; F16D 2129/10
USPC .......................... 188/160, 161, 162, 164, 171
See application file for complete search history.

(56) References Cited

U.S. PATENT DOCUMENTS

| | | | |
|---|---|---|---|
| 3,763,968 A * | 10/1973 | Noly | F16D 55/02 188/171 |
| 4,953,669 A * | 9/1990 | Severinsson | B60T 13/04 188/158 |
| 5,185,542 A | 2/1993 | Lazorchak | |
| 5,219,049 A * | 6/1993 | Unterborn | B60T 13/741 188/156 |
| 6,202,804 B1 * | 3/2001 | Dropmann | F16D 55/04 188/171 |
| 6,257,377 B1 * | 7/2001 | Schumann | F16D 65/00 188/156 |
| 6,269,917 B1 * | 8/2001 | Harting | F16D 55/02 188/161 |
| 7,063,190 B1 * | 6/2006 | Sylvan | F16D 65/186 188/161 |
| 7,594,566 B2 * | 9/2009 | Rettmar | F16D 63/006 188/171 |
| 7,726,455 B2 * | 6/2010 | Benoit | F16D 27/108 192/114 R |
| 9,308,990 B2 * | 4/2016 | Drennen | B64C 25/44 |
| 2004/0060783 A1 * | 4/2004 | Severinsson | B60T 1/065 188/166 |
| 2006/0032712 A1 * | 2/2006 | Kollaard | F16D 28/00 188/72.8 |
| 2007/0068765 A1 | 3/2007 | Koga | |
| 2008/0251329 A1 * | 10/2008 | Rettmar | F16D 63/006 188/161 |
| 2015/0008091 A1 | 1/2015 | Drennen et al. | |

FOREIGN PATENT DOCUMENTS

| | | |
|---|---|---|
| DE | 102006023447 | 11/2007 |
| FR | 2135689 | 12/1972 |
| WO | 0249892 | 6/2002 |

* cited by examiner

BI-STABLE VOICE COIL PARK BRAKE

FIELD OF THE DISCLOSURE

The present disclosure relates to braking systems and methods, and more particularly, to park brake systems and methods.

BACKGROUND OF THE DISCLOSURE

Typical aircraft brakes comprise one or more rotors and stators that, when compressed axially, cause an aircraft wheel to resist rotation. While parked, it may be desirable to maintain brake compression to resist unwanted movement of the aircraft.

SUMMARY OF THE DISCLOSURE

In various embodiments, the present disclosure provides bi-stable voice coil park brake systems. A park brake system may comprise a motor shaft having a first diameter portion and a second diameter portion, the second diameter portion having a greater diameter than the first diameter portion, a spring disposed at least partially around a circumference of the motor shaft, a wire coil disposed at least partially around a circumference of a bobbin, a one-way clutch disposed at least partially within the bobbin and coaxial to the motor shaft, an annular magnet disposed coaxial to the motor shaft and distal to at least a portion of the bobbin, and a clutch release mechanism disposed coaxial to the motor shaft and around the first diameter portion. In response to a first voltage applied to the wire coil, the one-way clutch may translate axially in a first direction relative to the motor shaft and engage with the second diameter portion, preventing rotation of the motor shaft in a first rotational direction. In response to a second voltage applied to the wire coil, the one-way clutch may translate axially in a second direction relative to the motor shaft and engage with the clutch release mechanism, thereby allowing rotation of the motor shaft in a first rotational direction.

In various embodiments, the present disclosure provides methods of using a bi-stable voice coil park brake. Such methods may comprise applying a first voltage to a wire coil, translating a one-way clutch axially in a first direction, engaging the one-way clutch with a motor shaft, applying a second voltage to the wire coil, translating the one-way clutch in a second direction, and engaging the one-way clutch with a clutch release mechanism.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

An aircraft park brake system may comprise an end plate distal from a plurality of interleaved rotor disks and stator disks which together form a brake heat sink. Each rotor disk may be coupled to a wheel for rotation therewith and each stator disk may be coupled to a wheel support, which resists rotation. The brake mechanism also generally includes a torque tube and a back leg on which a pressure plate, end plate, and stator disks are slidably mounted against rotation relative to the wheel and rotor disks. The stator disks may comprise two wear faces and the pressure plate may comprise a single wear face. The rotor disks and stator disks may be formed of a friction material, such as a carbon/carbon or a carbon metallic matrix material. A brake head may house the piston motor or one or more rams that extend to move the pressure plate and axially compress the brake disk stack against the end plate.

In various embodiments, a brake system may comprise a brake system controller ("BSC") coupled to one or more electromechanical actuator controllers ("EMACs"), each of which may drive an electromechanical actuator ("EMA"). The BSC may be in communication with a brake pedal, and thus may control the EMACs in accordance with pilot/copilot braking commands. The EMA may be coupled to or otherwise operate a pressure generating device, such as, for example, a ball screw, a ram, and/or the like. In operation, the EMA may cause the pressure generating device to move and/or exert a force on other brake system structures, such as a brake disk or pad to exert a stopping force on a wheel or other suitable moving structure. This stopping force may load and/or exert a corresponding force on the EMA structures such as, for example, an EMA housing.

Figure 1:
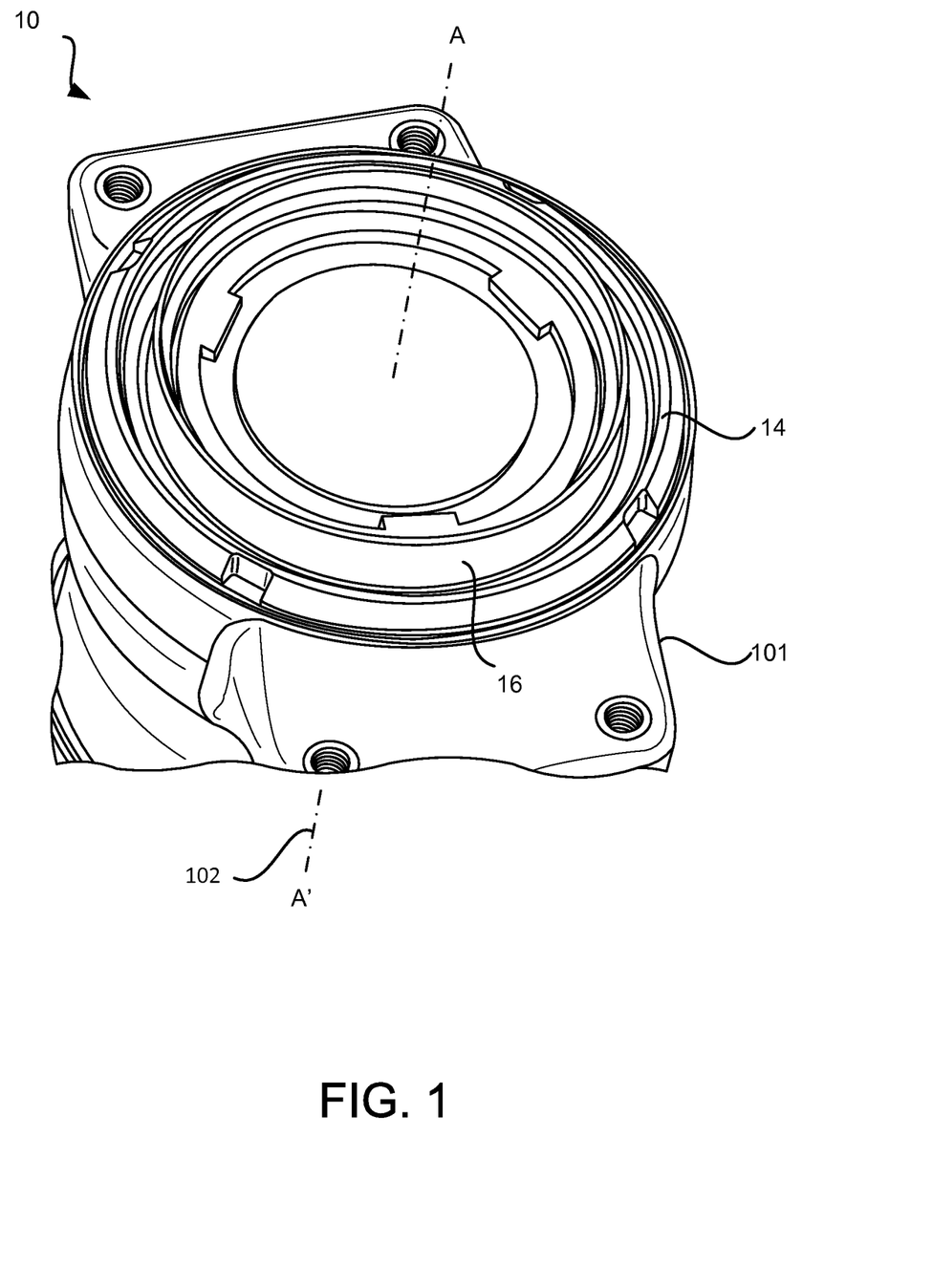
FIG. 1 illustrates a perspective view of an electromechanical actuator in accordance with various embodiments.

Referring to FIG. 1, a perspective view of an EMA 10 is shown in accordance with various embodiments. The EMA may extend along an axis 102 marked A-A', with A being located near a proximal portion of EMA 10 and A' being near a distal portion of EMA 10. The EMA 10 may, as described above, be involved in the application of a braking force to the aircraft wheel. The EMA 10 may comprise an EMA housing 101, which may extend along the axis 102. The EMA housing 101 may house a variety of components, including, for example, a ball nut 14, a ball screw 16, and a motor drive unit. Generally, the motor drive unit may drive the ball screw 16 through a plurality of rotations. As the ball screw 16 rotates, the ball nut 14 may translate distally and/or proximally along the axis 102 (depending upon the direction of rotation of the ball screw 16). The ball nut 14 may be coupled to a disc or "puck" at a proximal end thereof The puck may exert a pressure against a brake stack coupled to an aircraft wheel to impede or halt a rolling motion of the wheel. The EMA may include a park brake system. For example, the EMA may comprise a bi-stable park brake system as described herein.

Figure 2A:
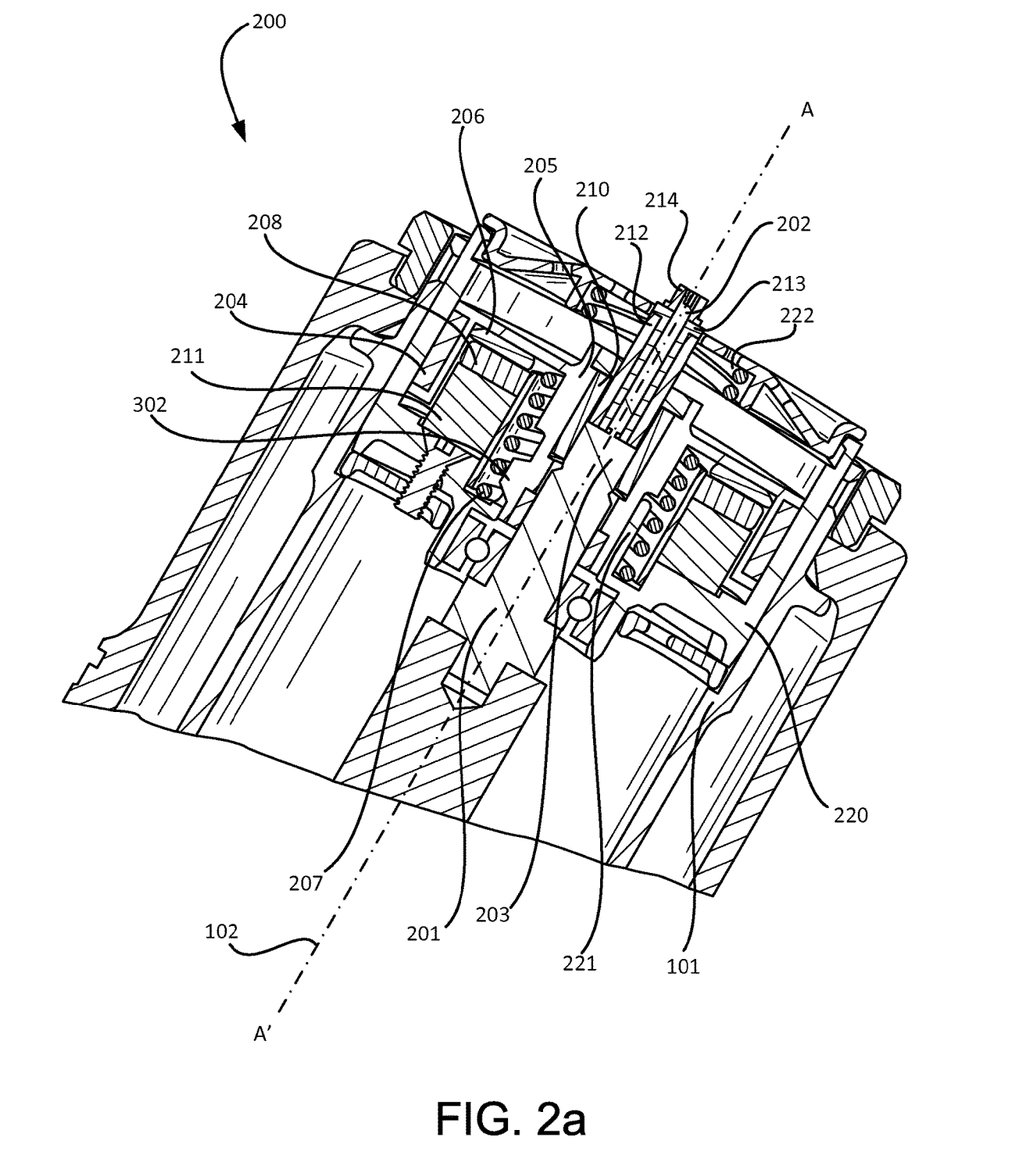
FIG. 2a illustrates a schematic cross-section view of a park brake system in accordance with various embodiments.
Figure 2B:
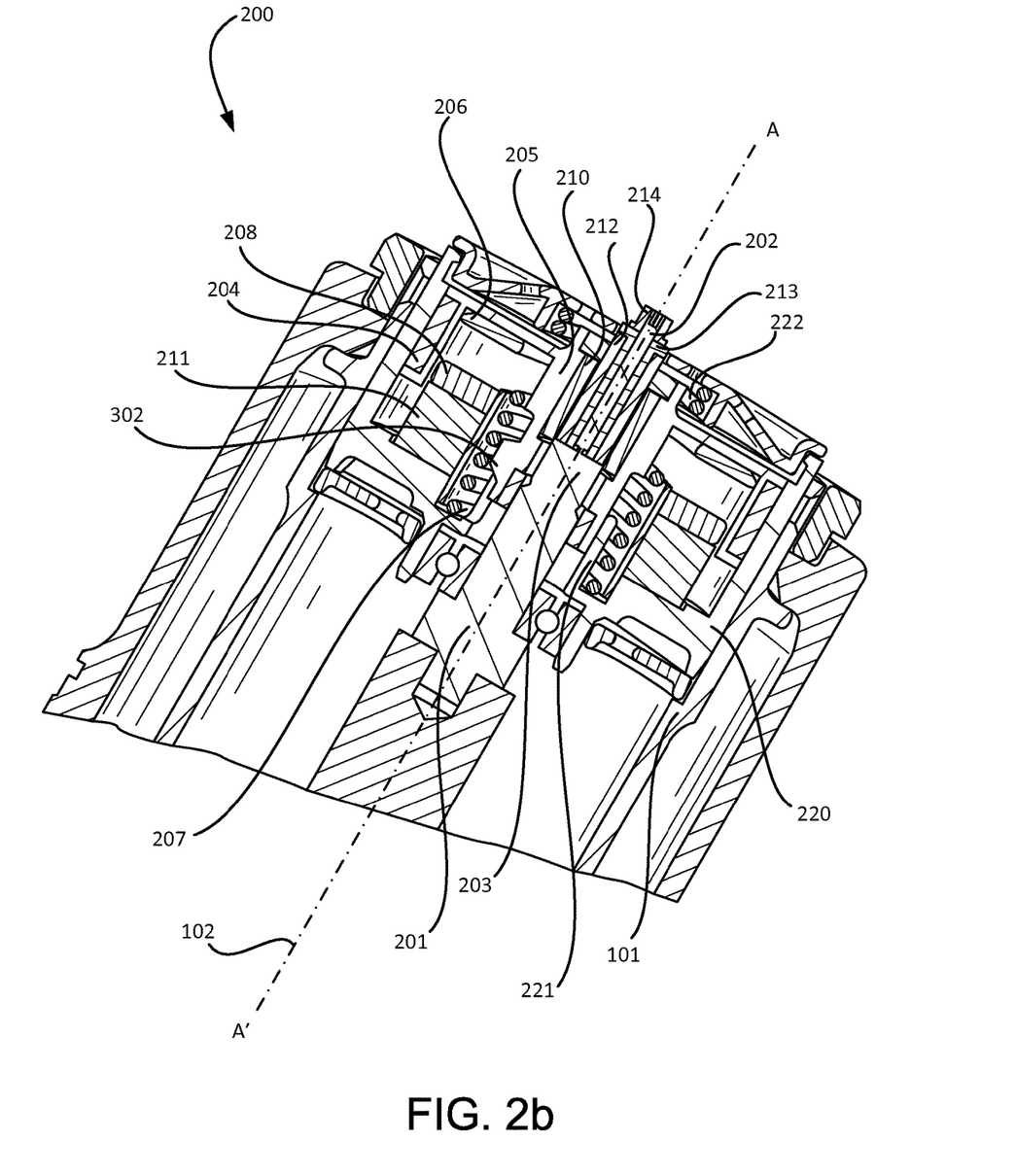
FIG. 2b illustrates a further schematic cross-section view of a park brake system in accordance with various embodiments.

With reference to FIGS. 2a and 2b, a park brake system 200, in accordance with various embodiments, may comprise a motor shaft 201 having a first diameter portion 202 and a second diameter portion 203. The motor shaft 201 may be disposed axially about an axis 102. The second diameter portion 203 may have a greater diameter than the first diameter portion 202. The motor shaft 201 may contain an abrupt change in diameter between the first diameter portion 202 and the second diameter portion 203.

The park brake system 200 may further comprise a wire coil 204 disposed at least partially around a circumference of a bobbin 205. The wire coil 204 may comprise a wire or other conductive material that is wound at least partially around a circumference of a bobbin 205. The wire coil 204 may comprise copper or any other material now known or hereinafter developed capable of creating a magnetic field in response to conducting an electrical current.

The bobbin may comprise a radial disk portion and a circumferential flange portion, wherein the circumferential flange portion extends in a distal direction from an outer circumference of the radial disk portion. The bobbin 205 may comprise a ferromagnetic material and/or may comprise a ferromagnetic insert. In various embodiments, a plurality of ferromagnetic inserts may be disposed in apertures of the bobbin 205. In various embodiments, the park brake system 200 may comprise an annular bobbin washer 206 disposed coaxial to the motor shaft 201 and distal to the radial disk portion of the bobbin 205. The annular bobbin washer 206 may be operatively coupled to the bobbin 205 and may comprise ferromagnetic material.

The park brake system 200 may further comprise a spring 207 disposed at least partially around a circumference of the motor shaft 201. The spring 207 may exert a proximal force on the bobbin 205 (i.e., towards A along axis 102).

The park brake system 200 may further comprise a one-way clutch 210 housed at least partially in the bobbin 205. The one-way clutch 210 may be disposed coaxial to the motor shaft 201 along axis 102. The one-way clutch 210 is not particularly limited according to various embodiments and, thus, may include any now known or hereinafter developed one-way clutch. For example, various one-way clutches may include any one of an HF type one-way clutch, an HFL type one-way clutch, an NCM type one-way clutch, an NHF type one-way clutch, an NCU type one-way clutch, an NCZ type one-way clutch, an NCZC type one-way clutch, an NCZX type one-way clutch, and an NCUX type one-way clutch, all commercially available from the NTN® Corporation.

The park brake system 200 may further comprise an annular magnet 211 and an annular steel ring 208. The annular magnet 211 and the annular steel ring 208 may be disposed coaxial to the motor shaft 201 and distal to the radial disk portion of the bobbin 205. In various embodiments, the annular magnet 211 is disposed distal of the annular steel ring 208. Accordingly, in various embodiments, wire coil 204, bobbin 205, annular steel ring 208, and annular magnet 211 may form a voice coil assembly.

In response to a first voltage being applied to the wire coil 204, a magnetic axial force may be generated by a flux field created by the wire coil 204 and the annular magnet 211. The annular steel ring 208 may be made from a ferromagnetic material and may be disposed relative to the wire coil 204 such that the magnetic axial force acts in a distal direction. Stated differently, the magnetic axial force may act in a direction opposite the proximal force exerted by the spring 207.

In response to the magnetic axial force, the bobbin 205, which is operatively coupled to the one-way clutch 210, may translate axially in a first direction. The first direction may be in a distal direction relative to the motor shaft 201. The bobbin 205 and one-way clutch 210 may translate from the first diameter portion 202 at least partially to the second diameter portion 203, causing the one-way clutch 210 to engage the motor shaft 201 about the second diameter portion 203. In various embodiments, the bobbin 205 and one-way clutch 210 may translate distally for a first distance such that the one-way clutch 210 partially surrounds the first diameter portion 202 and partially surrounds the second diameter portion 203. In various embodiments, the bobbin 205 and one-way clutch 210 may translate distally for a second distance such that the one-way clutch 210 surrounds the second diameter portion 203, but does not surround the first diameter portion 202.

With reference to FIG. 2a, the park brake system 200 is illustrated in an engaged state. In that regard, the one-way clutch 201 is at least partially engaged to the motor shaft 201 about the second diameter portion 203 and constrains the motor shaft 201 from rotating in a first rotational direction. As previously described, in various embodiments, a first voltage may be applied to the wire coil 204 and, thus, the bobbin 205 and the one-way clutch 210 may translate axially. The bobbin 205 may translate axially until contacting the annular steel ring 208 and/or until the annular bobbin washer 206 contacts the annular steel ring 208. In various embodiments, the magnetic axial force acting on the bobbin 205 in a distal direction may be greater than the force of the spring 207 acting on the bobbin 205 in a proximal direction.

The bobbin 205 may be held in contact with the annular steel ring 208 due to the proximity of the bobbin 205 and/or the annular bobbin washer 206 to the annular magnet 211. Thus, in various embodiments, the one-way clutch 210 may maintain engagement with the second diameter portion 203 of the motor shaft 201. Engagement of the one-way clutch 210 with the motor shaft 201 may prevent rotation of the motor shaft 201 in a first rotational direction. In various embodiments, annular magnet 211 may be a permanent magnet. In that regard, annular magnet 211 may constrain bobbin 205 and/or the annular bobbin washer 206 from axial movement without drawing external electrical energy. In that regard, park brake system 200 is in a stable engaged state in that no external energy is used to maintain park brake system 200 in an engaged state.

With reference to FIG. 2b, the park brake system 200 is illustrated in a disengaged state. In that regard, the one-way clutch 210 is disposed about the first diameter portion 202 and is not engaged to the motor shaft 201. In a disengaged state, the one-way clutch 210 does not constrain the motor shaft 201 from rotating in a first rotational direction. In response to a second voltage being applied to the wire coil 204, the one-way clutch 210 may translate axially in a second direction. In various embodiments, the second voltage may be reversed relative to the first voltage and the second direction may be in a proximal direction relative to the motor shaft 201. In various embodiments, application of the second voltage may allow the force of the spring 207 acting on the bobbin 205 in a proximal direction to overcome the force of the annular magnet 211 acting on the bobbin 205 in a distal direction. The bobbin 205 and the one-way clutch 210 may be translated proximally until they are disposed about the first diameter portion 202 of the motor shaft 201. In various embodiments, the spring 207 may constrain the bobbin 205 and/or the annular bobbin washer 206 from axial movement without drawing external electrical energy. In that regard, park brake system 200 is in a stable disengaged state in that no external energy is used to maintain park brake system 200 in a disengaged state.

With reference again to FIGS. 2a and 2b, the park brake system 200 may further comprise a clutch release mechanism disposed coaxial to the motor shaft 201 and around the first diameter portion 202. In various embodiments, the clutch release mechanism may comprise a clutch release bearing 212 and a clutch release bearing support 213. The clutch release bearing 212 may be disposed coaxial to the motor shaft 201 and around the first diameter portion 202. The clutch release bearing support 213 may be disposed coaxial to the motor shaft 201 and between the first diameter portion 202 and the clutch release bearing 212.

In various embodiments and with reference to FIG. 2b, the one-way clutch 210 may be configured to engage with the clutch release bearing 212 when the park brake system 200 is in a disengaged state. Engagement of the one-way clutch 210 to the clutch release bearing 212 may prevent rotation of the clutch release bearing 212 in a first rotational direction. The clutch release bearing support 213 may be configured to freely rotate within the clutch release bearing 212. Thus, engagement of the one-way clutch 210 to the clutch release bearing 212 may not prevent rotation of the clutch release bearing support 213 or the motor shaft 201 in either direction. In various embodiments, the clutch release bearing support 213 may comprise a low-friction material; however, clutch release bearing support 213 may comprise any material suitable to allow rotation of the clutch release bearing support 213 and/or the motor shaft 201 within the clutch release bearing 212 in response to being engaged with the one-way clutch 210.

The clutch release mechanism may further comprise a clutch release bearing nut 214. The clutch release bearing nut 214 may be disposed coaxial to the motor shaft 201, around the first diameter portion 202, and proximal to the clutch release bearing support 213. In various embodiments, the clutch release bearing nut 214 may be operatively coupled to the motor shaft 201 and may be configured to prevent the movement of the clutch release bearing 212 and/or the clutch release bearing support 213 in a proximal direction relative to the motor shaft 201.

Figure 3:
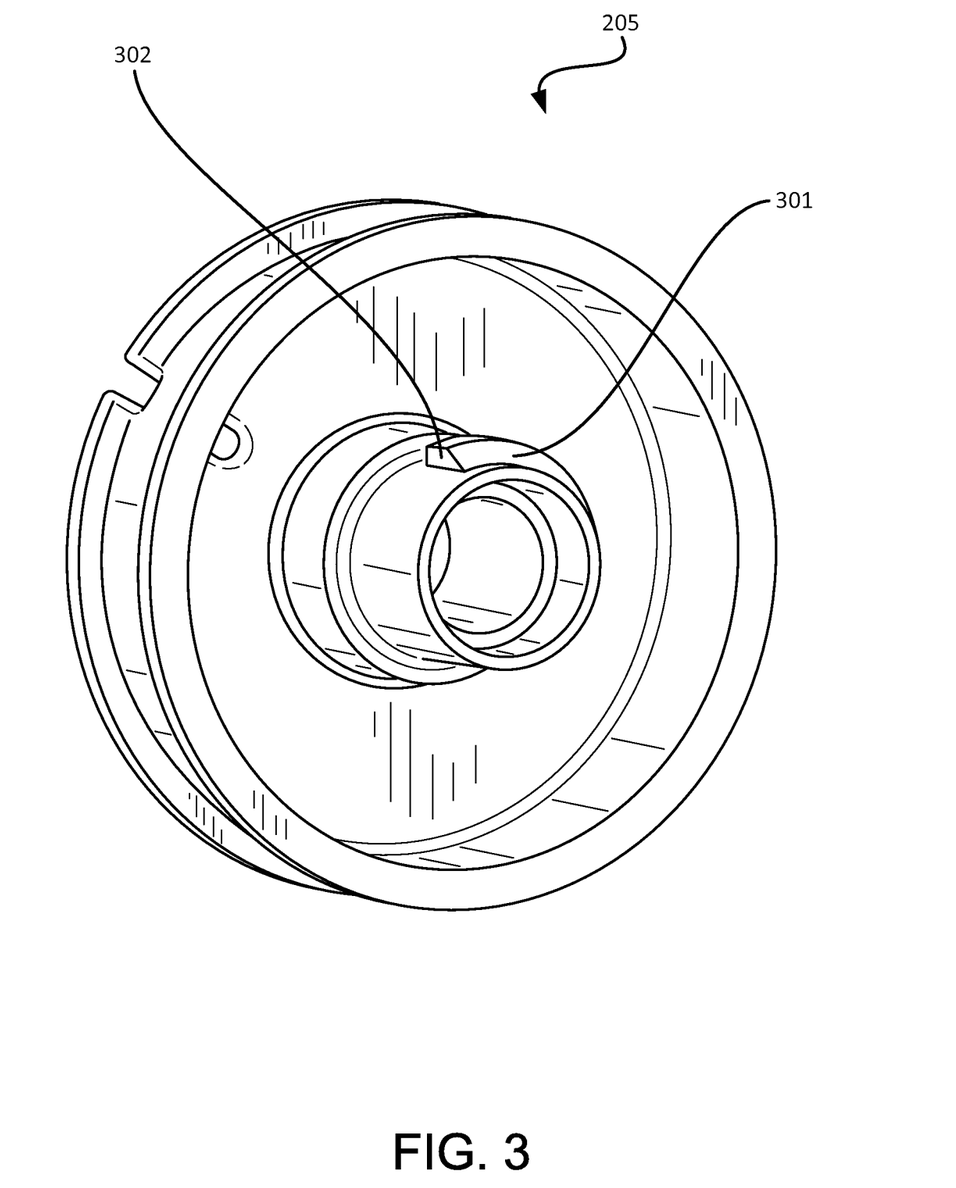
FIG. 3 illustrates a perspective view of a bobbin in accordance with various embodiments.

In various embodiments and with reference to FIG. 3, the bobbin 205 may comprise an anti-rotation guide 301. The anti-rotation guide 301 may comprise a buttress or ridge disposed on, and partially surrounding, an inner circumference of the bobbin 205. The anti-rotation guide 301 may further comprise an anti-rotation face 302 disposed at an end of the anti-rotation guide 301.

In various embodiments and referring back to FIGS. 2a and 2b, the park brake system 200 may further comprise a voice coil housing 220. The voice coil housing 220 may be disposed coaxial to the motor shaft 201 and may comprise an outer circumferential flange and an inner flange. The voice coil housing 220 may be disposed such that the outer flange at least partially surrounds the wire coil 204, bobbin 205, annular steel ring 208, and annular magnet 211. The inner flange may partially surround the inner circumference of the bobbin 205. The voice coil housing 220 may be configured such that it does not rotate relative to the EMA housing 101. In various embodiments, an anti-rotation stop 221 may be disposed on the inner flange of the voice coil housing 220. The anti-rotation stop 221 may be configured to align with the anti-rotation face 302 when the park brake system 200 is in an engaged state.

With reference to FIG. 2a, engagement of the one-way clutch 210 to the motor shaft 201 may prevent rotation of the motor shaft 201 relative to the one-way clutch 210 in a first rotational direction. Thus, rotational force acting on the motor shaft 201 in the first rotational direction may be translated both to the one-way clutch 210 and also to the bobbin 205, to which the one-way clutch 210 may be operatively coupled. Rotation of the bobbin 205 in the first rotational direction may be prevented by the anti-rotation stop 221, which may be configured to align with the anti-rotation face 302 of the bobbin 205. When the park brake system 200 is in an engaged state, the anti-rotation stop 221 may be aligned axially and radially with the anti-rotation face 302; stated differently, at least a portion of the anti-rotation stop 221 and the anti-rotation face 302 may be disposed at the same axial point along the axis 102 and at the same radial distance from the axis 102. Rotational force acting on the motor shaft 210 may cause the bobbin 205 to rotate around the axis 102 until the anti-rotation face 302 contacts the anti-rotation stop 221. Such contact may constrain the bobbin 205, the one-way clutch 210, and the motor shaft 201 from further rotation.

In various embodiments and with reference to FIGS. 2a and 2b, the park brake system 200 may further comprise a damper mechanism 222. The damper mechanism 222 may be disposed coaxially around the motor shaft 201 and proximal of the bobbin 205. In response to a first voltage being applied to the wire coil 204, the bobbin 205 and one-way clutch 210 may translate axially in a proximal first direction relative to the motor shaft 201. In various embodiments, translation of the bobbin 205 and one-way clutch 210 may be at high velocity and/or acceleration. The bobbin 205 and one-way clutch 210 may impact other portions of the park brake system 200 during or at the termination of axial translation in a proximal first direction, causing stress, wear, or damage to the system components. The damper mechanism 222 may be configured to decrease the velocity and/or dissipate the kinetic energy of the bobbin 205 and one-way clutch 210 as they translate axially in a proximal first direction. The damper mechanism 222 may comprise a spring, washer, pad, hydraulic mechanism, or any other suitable mechanism for dissipating kinetic energy.

Figure 4:
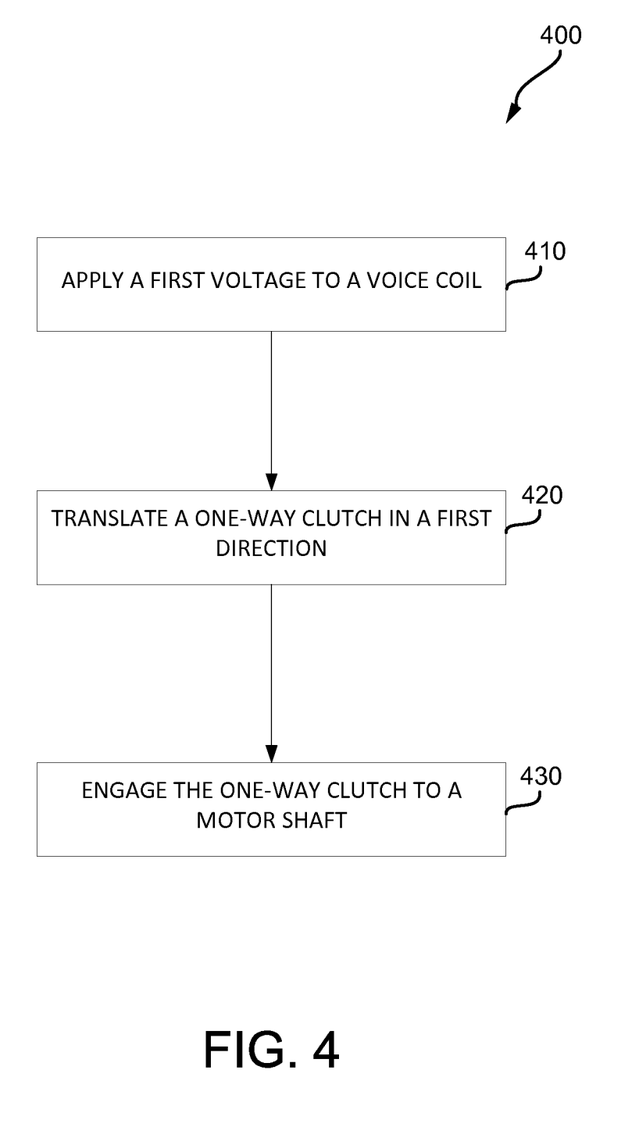
FIG. 4 illustrates a method of engaging a park brake system in accordance with various embodiments.

With reference to FIGS. 2a and 4, a method 400 of engaging a park brake system 200 may comprise applying a first voltage to a wire coil 204 (Step 410). In various embodiments, the wire coil 204 may be disposed at least partially around a circumference of a bobbin 205, wherein a one-way clutch 210 is disposed at least partially within the bobbin 205 and coaxial to a motor shaft 201 having a first diameter portion 202 and a second diameter portion 203, the second diameter portion 203 having a greater diameter than the first diameter portion 202. In various embodiments, the first voltage may be applied by an EMAC. Method 400 may also comprise translating a one-way 210 clutch axially in a first direction with respect to the motor shaft 201 (Step 420). In various embodiments, method 400 may comprise engaging the one-way clutch 210 to the second diameter portion 203 (Step 430). The rotation of the motor shaft 201 may be prevented in a first rotational direction in response to engagement of the one-way clutch to the motor shaft.

Figure 5:
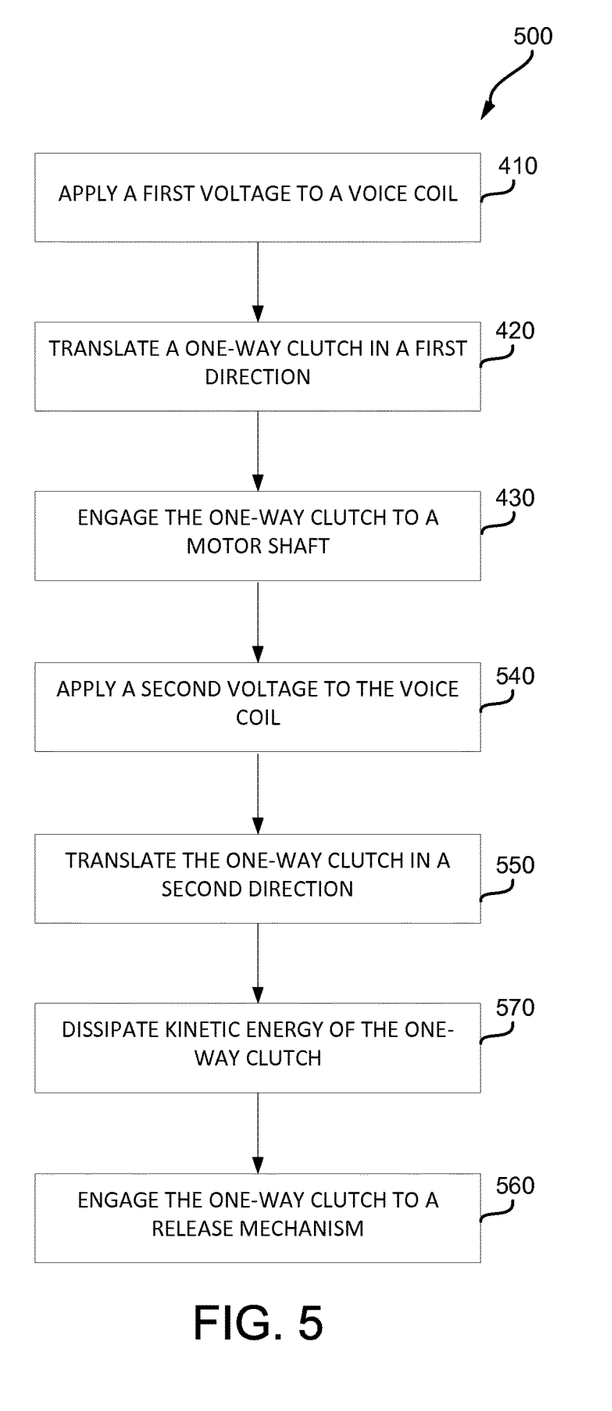
FIG. 5 illustrates a method of engaging and disengaging a park brake system in accordance with various embodiments.

With reference to FIGS. 2a, 2b, and 5, a method 500 of engaging and disengaging a park brake system 200 may comprise applying a first voltage to a wire coil 204 (Step 410). In various embodiments, the wire coil 204 may be disposed at least partially around a circumference of a bobbin 205, wherein a one-way clutch 210 is disposed at least partially within the bobbin 205 and coaxial to a motor shaft 201 having a first diameter portion 202 and a second diameter portion 203, the second diameter portion 203 having a greater diameter than the first diameter portion 202. In various embodiments, the first voltage may be applied by an EMAC.

Method 500 may further comprise translating a one-way clutch 210 axially in a first direction with respect to the motor shaft 201 (Step 420). In various embodiments, method 500 may comprise engaging the one-way clutch 210 to the second diameter portion 203 (Step 430). The rotation of the motor shaft 201 may be prevented in a first rotational direction in response to engagement of the one-way clutch 210 to the motor shaft 201.

Method 500 may further comprise applying a second voltage to the wire coil 204 (Step 540). In various embodiments, method 500 may include translating the one-way clutch 210 axially in a second direction (Step 550) and disposing the one-way clutch 210 about the first diameter portion 202 of the motor shaft 201 (Step 560). In various embodiments, disposing the one-way clutch 210 about the first diameter portion 202 may disengage the one-way clutch 210 from the second diameter portion 203 of the motor shaft 201, allowing rotation of the motor shaft 201 in a first rotational direction.

Method 500 is not particularly limited and may further comprise dissipating a kinetic energy of the one-way clutch 210 as it translates in the second direction (Step 570). The kinetic energy may be dissipated by a damper mechanism 222 disposed coaxial to the motor shaft 201 and proximal to the bobbin 205.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A park brake system, comprising:
   a motor shaft having a first diameter portion and a second diameter portion, the second diameter portion having a greater diameter than the first diameter portion,
   a spring disposed at least partially around a circumference of the motor shaft,
   a wire coil disposed at least partially around a circumference of a bobbin,
   a one-way clutch disposed at least partially within the bobbin and coaxial to the motor shaft,
   an annular magnet disposed coaxial to the motor shaft and distal to at least a portion of the bobbin, and
   a clutch release mechanism disposed coaxial to the motor shaft and around the first diameter portion,
   wherein, in response to a first voltage applied to the wire coil, the one-way clutch translates axially in a first direction relative to the motor shaft and engages with the second diameter portion, and
   wherein, in response to a second voltage applied to the wire coil, the one-way clutch translates axially in a second direction relative to the motor shaft and engages with the clutch release mechanism.

2. The park brake system of claim 1, wherein the clutch release mechanism further comprises:
   a clutch release bearing disposed coaxial to the motor shaft and around the first diameter portion,
   a clutch release bearing support disposed coaxial to the motor shaft and between the clutch release bearing and the first diameter portion, and
   a clutch release bearing nut disposed coaxial to the motor shaft, around the first diameter portion, and proximal to the clutch release bearing support.

3. The park brake system of claim 2, wherein the one-way clutch is disposed to prevent rotation of the motor shaft in a first rotational direction in response to engagement with the second diameter portion.

4. The park brake system of claim 3, further comprising an annular bobbin washer disposed coaxial to the motor shaft, proximal to the annular magnet, and distal to at least a portion of the bobbin.

5. The park brake system of claim 3, wherein the bobbin comprises a ferromagnetic insert.

6. The park brake system of claim 3, wherein the second voltage is reversed relative to the first voltage.

7. The park brake system of claim 3, wherein the spring exerts a proximal force on the bobbin.

8. The park brake system of claim 3, further comprising:
an anti-rotation stop disposed on a voice coil housing, and
an anti-rotation guide disposed on the bobbin and having an anti-rotation face,
wherein, in response to the one-way clutch engaging with the second diameter portion, the anti-rotation stop and the anti-rotation face are disposed adjacent to one another.

9. The park brake system of claim 3, further comprising a damper mechanism disposed coaxial to the motor shaft and proximal to the bobbin.

10. An electromechanical actuator ("EMA"), comprising the park brake system of claim 1.

11. A method comprising:
applying a first voltage to a wire coil disposed at least partially around a circumference of a bobbin, wherein a one-way clutch is disposed at least partially within the bobbin and coaxial to a motor shaft having a first diameter portion and a second diameter portion, the second diameter portion having a greater diameter than the first diameter portion,
translating the one-way clutch axially in a first direction with respect to the motor shaft, and
engaging the one-way clutch to the second diameter portion, wherein rotation of the motor shaft is prevented in a first rotational direction in response to engagement of the one-way clutch with the motor shaft.

12. The method of claim 11, further comprising:
applying a second voltage to the wire coil,
translating the one-way clutch axially in a second direction,
disposing the one-way clutch around the first diameter portion, and
engaging the one-way clutch to a clutch release mechanism disposed coaxial to the motor shaft and around the first diameter portion.

13. The method of claim 12, further comprising:
dissipating a kinetic energy of the one-way clutch as it translates in the second direction by a damper mechanism disposed coaxial to the motor shaft and proximal to the bobbin.

14. The method of claim 12,
wherein, in response to engagement of the one-way clutch with the second diameter portion, rotation of the motor shaft is prevented in a first rotational direction, and
wherein, in response to engagement of the one-way clutch with the clutch release mechanism, rotation of the motor shaft is not prevented in the first rotational direction.

15. The method of claim 12, wherein the first voltage is applied by an electromechanical actuator controller ("EMAC").

* * * * *